United States Patent
Lewis et al.

(10) Patent No.: US 11,609,688 B2
(45) Date of Patent: Mar. 21, 2023

(54) SYSTEMS AND METHODS FOR MANAGING ON-SITE MACHINES BY SPATIAL AND CONTEXTUAL INFORMATION

(71) Applicant: Caterpillar Inc., Peoria, IL (US)

(72) Inventors: Adam Lewis, Holland Park (AU); Daniel P. Adcock, McDowall (AU); Thomas F. Doherty, Holland Park (AU); John Harpour, Thornlands (AU); Alison Brandon, Upper Brookfield (AU); Alexander Ball, South Brisbane (AU); Carla Wesley, Samford Village (AU)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/330,267

(22) Filed: May 25, 2021

(65) Prior Publication Data

US 2022/0382439 A1 Dec. 1, 2022

(51) Int. Cl.
| | |
|---|---|
| *G06F 3/04842* | (2022.01) |
| *G07C 5/06* | (2006.01) |
| *G08G 1/00* | (2006.01) |
| *G07C 5/00* | (2006.01) |
| *E02F 9/20* | (2006.01) |

(52) U.S. Cl.
CPC ......... *G06F 3/04842* (2013.01); *G07C 5/008* (2013.01); *G07C 5/06* (2013.01); *G08G 1/20* (2013.01); *E02F 9/2054* (2013.01); *G06F 2203/04803* (2013.01); *G06F 2203/04806* (2013.01)

(58) Field of Classification Search
CPC ....... G06F 3/04842; G06F 2203/04803; G06F 2203/04806; G07C 5/008; G07C 5/06; G08G 1/20; E02F 9/2054
See application file for complete search history.

(56) References Cited

U.S. PATENT DOCUMENTS

| | | | |
|---|---|---|---|
| 10,338,578 B2 | 7/2019 | Thwaites et al. | |
| 10,746,015 B2 | 8/2020 | Munda et al. | |
| 2004/0252119 A1* | 12/2004 | Hunleth | G06F 16/40 345/698 |

(Continued)

FOREIGN PATENT DOCUMENTS

| | | |
|---|---|---|
| WO | 2018130993 A2 | 7/2018 |
| WO | 2020072720 A1 | 4/2020 |

OTHER PUBLICATIONS

Written Opinion and International Search Report for Int'l Patent Appln. No. PCT/US2022/027832, dated Aug. 18, 2022(9 pgs).

*Primary Examiner* — Justin R. Blaufeld
(74) *Attorney, Agent, or Firm* — Perkins Coie LLP

(57) ABSTRACT

The present disclosure is directed to systems and methods for managing on-site machines. The method includes, for example, (i) receiving geospatial information associated with a work site; (ii) generating a user interface on at least one display; (iii) displaying a first machine of the multiple machines within the first section in a first compressed view; (iv) selecting a second machine of the multiple machines; (v) in response to the selection of the second machine of the multiple machines within the second section, visually presenting at least one portion of the work site in an elevated view; and (vi) visually presenting the second machine of the multiple machines in a second compressed view.

20 Claims, 14 Drawing Sheets

(56) References Cited

U.S. PATENT DOCUMENTS

| | | | |
|---|---|---|---|
| 2010/0274479 A1* | 10/2010 | Sheha | H04W 4/027 |
| | | | 340/995.13 |
| 2011/0041088 A1* | 2/2011 | Mason | G09B 29/10 |
| | | | 715/767 |
| 2013/0007626 A1* | 1/2013 | Adams | G07C 5/008 |
| | | | 715/738 |
| 2014/0006074 A1* | 1/2014 | Cockburn | E02F 9/261 |
| | | | 705/7.11 |
| 2014/0088820 A1 | 3/2014 | Jericho | |
| 2014/0089035 A1* | 3/2014 | Jericho | G06Q 50/02 |
| | | | 705/7.11 |
| 2016/0216706 A1 | 7/2016 | Christensen | |
| 2016/0348504 A1 | 12/2016 | Hanski | |
| 2018/0293891 A1* | 10/2018 | Troutman | G08G 1/13 |
| 2019/0050092 A1* | 2/2019 | Yamashita | G06Q 50/30 |
| 2019/0072407 A1 | 3/2019 | Fang | |
| 2020/0074383 A1 | 3/2020 | Smith | |
| 2020/0241990 A1 | 7/2020 | Gustafson et al. | |
| 2021/0295621 A1* | 9/2021 | Kang | G07C 5/0825 |
| 2022/0027829 A1* | 1/2022 | Karube | G06Q 10/06393 |

\* cited by examiner

SYSTEMS AND METHODS FOR MANAGING ON-SITE MACHINES BY SPATIAL AND CONTEXTUAL INFORMATION

TECHNICAL FIELD

The present technology is directed to systems and methods for managing on-site machines, vehicles, and/or other suitable devices. More particularly, systems and methods for managing on-site machines via a user interface providing spatial and contextual information of one or more selected machines such that an operator can effectively manage the selected machines.

BACKGROUND

In a work site, an operator (or a controller) manages multiple machines at the same time. These machines are assigned with various types of tasks that need to be performed simultaneously. For the operator to effectively manage these machines in a "real-time" or timely manner, the operator needs to have sufficient information of these machines. When the amount of such information increases, it is challenging to effectively present such information to the operator such that the operator can have a clear view of one or more selected machine as well as information relevant to the selected machine. U.S. Patent Publication No. 2020/0241990 (GUSTAFSON) discloses a computing system configured to derive insights related to an asset operation. GUSTAFSON's system includes a graphic user interface (GUI) with a pane that provides a high-level overview of the insights and a detailed pane with information regarding a selected one of the subsets of insights. More particularly, in paragraph [0038], GUSTAFSON's detailed pane "include[s] a variety of different GUI panels, which may depend on the nature of the first selected insight." "In general, each panel includes relevant details for the first selected insight along with other contextual information and/or functions of interest related to the selected insight that the user may find valuable when deciding whether or not to take action on the insight." However, GUSTAFSON's system does not provide sufficient contextual information of a selected machine and effectively present the surroundings of that selected machine. Therefore, it is advantageous to have an improved method and system to address this issue.

BRIEF DESCRIPTION OF THE DRAWINGS

Non-limiting and non-exhaustive examples are described with reference to the following figures.

DETAILED DESCRIPTION

Figure 1:
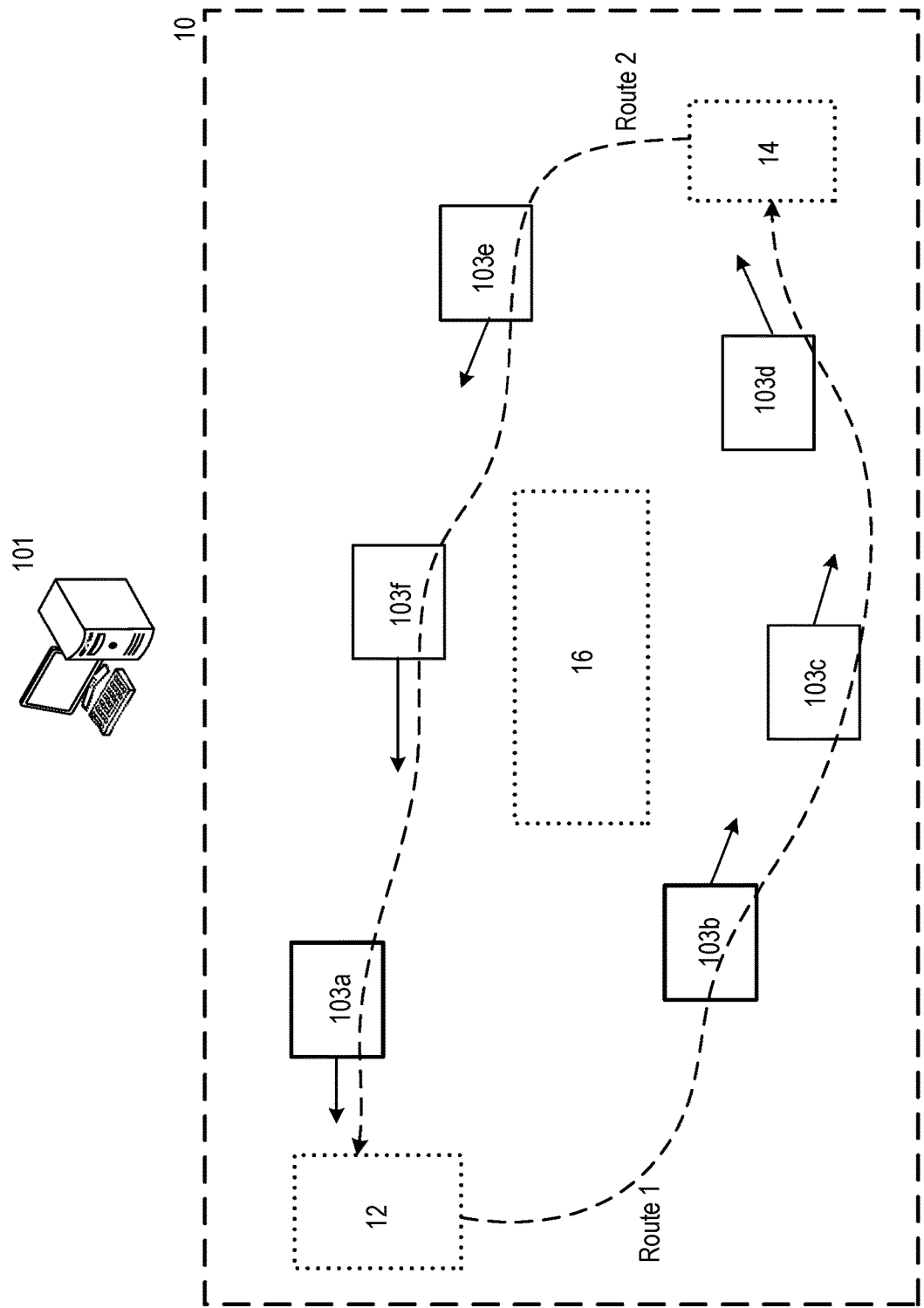
FIG. 1 is a schematic diagram illustrating a system in accordance with embodiments of the present technology.

Various aspects of the disclosure are described more fully below with reference to the accompanying drawings, which form a part hereof, and which show specific exemplary aspects. Different aspects of the disclosure may be implemented in many different forms and should not be construed as limited to the aspects set forth herein. Rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation, or an implementation combining software and hardware aspects. The following detailed description is, therefore, not to be taken in a limiting sense.

The present technology is directed to systems and methods for managing multiple machines, vehicles, or devices in a "real-time" or near "real-time" manner. The present system can manage one or more types of machines, and these machines can be assigned to perform one or more tasks. In a typical work site, an operator (or a controller) can manage 20 to 80 machines simultaneously (for certain types of machines that requires more attention, 40-60 machines). The present system provides sufficient spatial and contextual information for selected one(s) of these machines, such that the operator can effectively manage these machines. In some embodiments, the operator can select only one machine to focus on for a certain period of time. In some embodiments, the operator can select two machines to focus on at the same time. In some embodiments, the operator can select more than two machines to focus on at the same time.

For example, the present technology provides an integrated user interface having multiple sections. In some embodiment, the multiple sections can include (i) a site map section configured to show geospatial information of a work site in various views), (ii) a monitoring section configured to show status or parameters of multiple machines in the work site, select one or more of the multiple machines to be displayed in the a site map section, and control the selected machine(s). Embodiments of the monitoring section are discussed in detail with reference to FIGS. 4A and 4B. Embodiments of the site map section are discussed in detail with reference to FIGS. 4C-4G. More particularly, FIG. 4C shows an overall view in the site map section. FIGS. 4D and 4G show elevated views (or "spatial" views) in the site map section. FIGS. 4E and 4F show compressed views (or "machine" views) in the site map section. By this arrangement, the site map section is configured to visually present "machine-oriented" or "machine-focused" views (e.g., zoom-in/zoom-out views based on the selected machine(s)), rather than only a simple zoom-in/zoom-out of a site map.

In some embodiments, the present technology enables the operator to focus or "lock" one or more machines (e.g., machines with a pending item that requires the operator's action) such that views focused on these machines are constantly displayed (with proper zoom-in/zoom-out views) in the user interface. In such embodiments, the site map section can be configured to visually present these focused or "locked" views of the selected machines. In some embodiments, the focused or "locked" views can also show other non-selected machines (as contextual information of the focused or locked machines).

The integrated user interface can be visually presented in one or more displays (e.g., 4-15 displays). The relative locations of these multiple sections in the one or more displays can be customized by the operator. For example, Operator A prefers putting the site map section at the right side of the monitoring section. As another example, Operator B may prefer putting the site map section at the center and breaking the monitoring section into multiple subsections (e.g., an equipment-finder section, a control section, a summary section, etc.) that surround the site map section.

One aspect of the present technology is that it provides multiple views for a selected machine and relevant machines such that the operator can have sufficient spatial and contextual information of the selected machine. These multiple views can be compressed views and/or elevated views with different views (e.g., views at different elevations). The elevations the views can be determined based on the numbers of machines to be displayed, the distances among one them, and other suitable factors (user preference, grouping of the machines, tasks of the machines, spatial information of the work site, etc.).

For example, an operator can select a first machine (e.g., a truck traveling to destination X.) In response to the selection of the first machine, a compressed view (e.g., FIG. 4E) of the first machine can be displayed such that the operator knows the surrounding the first machine (e.g., a structure nearby, an obstacle in a route, etc.) and its status. In some embodiments, the status of the first machine can be shown by (i) an indicator, such as a colored shape, showing whether the first machine is stopped, on schedule to its destination, or delayed, etc. and/or (ii) a bar showing a loading status of the first machine (e.g. a solid bar shows a full load, a half-filled bar shows a half load, etc.).

To provide more spatial and contextual information, multiple machines relevant to the first machine can also be displayed in an elevated view (e.g., FIG. 4D). For example, multiple machines that are traveling in the same route as the first machine can be displayed. In some embodiments, the multiple machines can be determined based on other factors such as a type of the first machine, a destination of the first machine, a starting point of the first machine, a task assigned to the first machine, etc. In some example, objects (structures, buildings, terrain features, workers, etc.) other than the machines can also be shown. The elevated view can be determined based on the total numbers of the machines (including the first machine) to be displayed. In some embodiments, the elevated view can be determined such that all of the machines to be displayed can be shown. In some embodiments, the elevated view can be determined such that all of the machines to be displayed can be located at the center portion of the whole viewing section. In some embodiments, the elevated view can be determined such that a structure or an obstacle near the first machine can be shown. In some embodiments, the criteria of the elevated view can be determined based on operator's preference or an operation manual.

In some embodiments, the operator can further select a second machine. In such embodiments, an elevated view that shows both the first and second machines can be displayed. In some embodiments, the elevated view can also include other machines or objects to be displayed. Once the elevated view has been displayed for a period of time, a second compressed view that focuses on the second machine can then be displayed. In some embodiments, the first machine can also be displayed in the second compressed view. The period of time of showing the elevated view can be determined based on the distance between the selected first and second machines. For example, the farther the distance between the first and second machines, the longer the period of time would be. In some embodiment, the period of time can be a fixed time period (e.g., 1 to 5 seconds).

To have a smooth transition between views, view changes are performed gradually among different views, such that the operator can experience a continuous, smooth "zoom-in" (e.g., "elevated view" to "compressed view") or "zoom-out" (e.g., "compressed view" to "elevated view") process. By this arrangement, the operator receives better contextual and spatial information when changing views (e.g., knowing relative locations of the machines to be displayed).

Another aspect of the present technology includes providing a method for managing multiple machines simultaneously. The method includes (1) receiving geospatial information associated with a work site; (2) generating a user interface on at least one display; (3) displaying a first machine of the multiple machines within a first section (e.g., a site map section discussed herein) of the user interface in a first compressed view; (4) selecting a second machine of the multiple machines within a second section (e.g., an equipment-finder section discussed herein) of the user interface; (5) visually presenting at least one portion of the work site in the first section in an elevated view; and (6) visually presenting the second machine of the multiple machines in the first section in a second compressed view. By this arrangement, the present method provides various views of selected machines and these views provides spatial and contextual information for the operator to manage the multiple machines.

FIG. 1 is a schematic diagram illustrating a system 100 in accordance with embodiments of the present technology. The system 100 includes a server 101 configured to manage on-site multiple machines 103 (machines 103a, 103b, 103c, 103d, 103e, and 103f are shown in FIG. 1 as an example) in a site 10. In the illustrated embodiment, machines 103a and 103b are of the same type (e.g., trucks), and machines 103c-f are a different type of machines (e.g., loaders).

The site 10 includes a first area 12, a second area 14, and an object 16. In some embodiments, the site 10 can be a mining site. The first area 12 can be a loading area, and the second area 14 can be an unloading area. The object 16 can be a structure, an obstacle, a terrain feature, a moving object, a worker, etc. The machines 103a-f are configured to move in the site 10 between the first area 12 and the second area 14, back and forth (by routes 1 and 2).

The server 101 communicates with the machines 103a-f via a wireless connection. An operator can, via the server 101, manage the operations of the machines 103a-f in the site 10. In some embodiments, the server 101 can generate an integrated user interface for the operator to manage the machines 103a-f. In other embodiments, the user interface can be generated by a computing device communicably coupled to the server 101. The integrated user interface can display various views of one of more selected machines of the machines 103a-f, such that the operator can manage the selected machines accordingly.

Figure 2A:
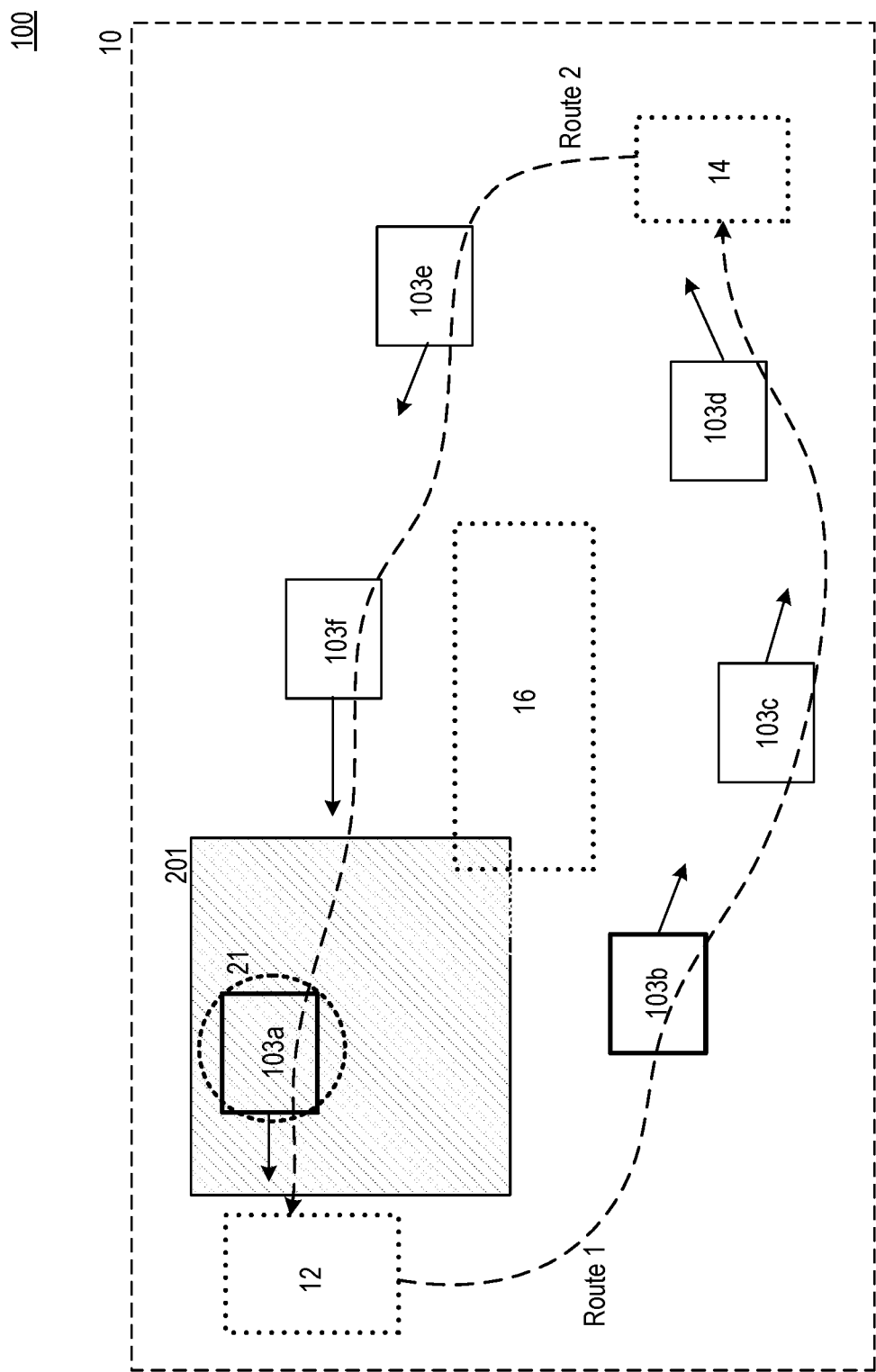
FIG. 2A is a schematic diagram illustrating a work site and a compressed view in accordance with embodiments of the present technology.

FIGS. 2A-2D are schematic diagrams illustrating various views of the work site 10 that can be displayed in the integrated user interface. As shown in FIG. 2A, when machine 103a is selected as a first machine 21 by the operator via the integrated user interface, a first compressed view 201 is displayed in the user interface. The first compressed view 201 shows the details of the selected first machine 21, a portion of route 2, as well as a portion of the object 16. The first compressed view 201 provides spatial and contextual information of the selected first machine 21 (i.e., machine 103a).

Figure 2B:
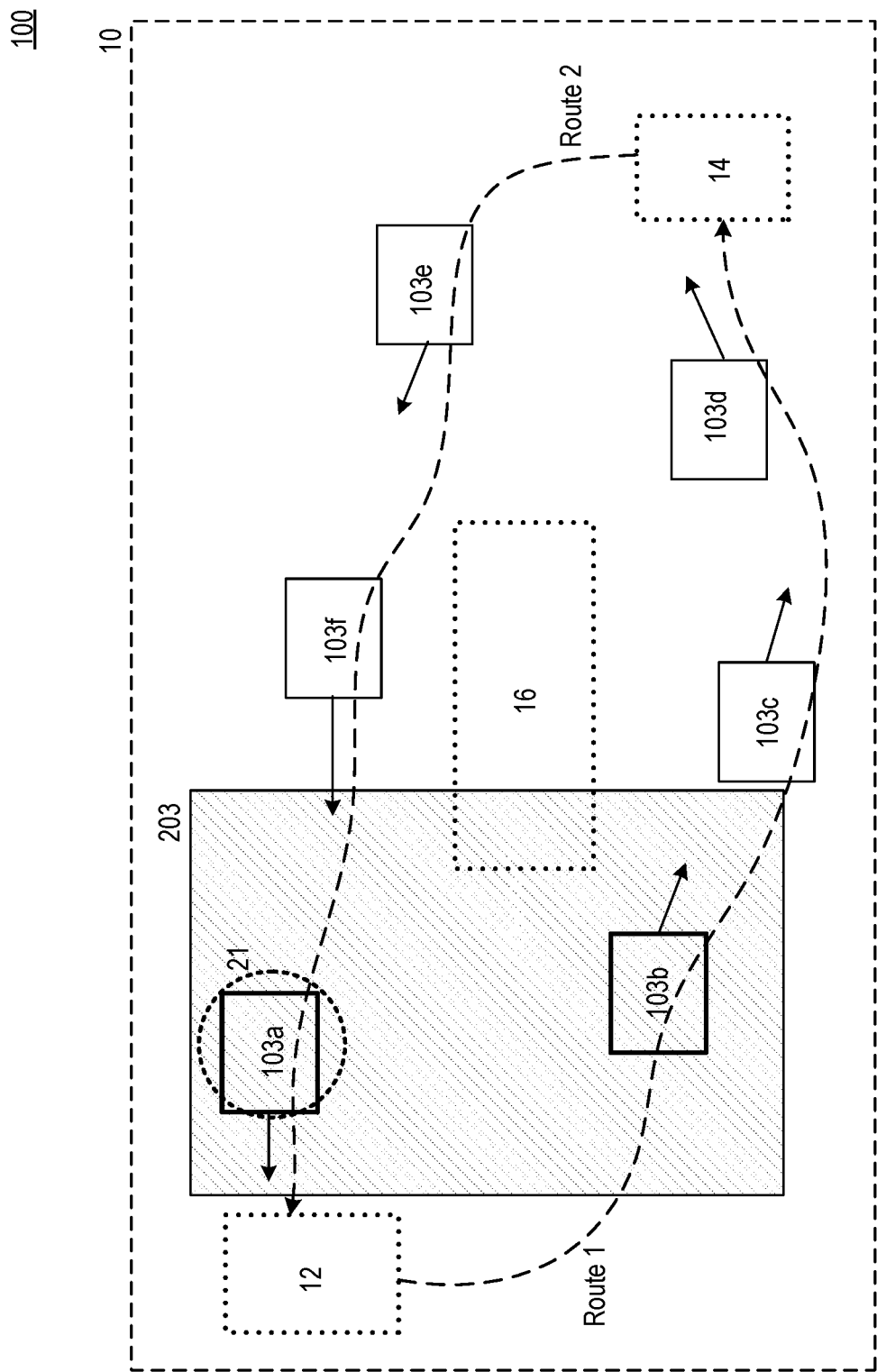
FIG. 2B is a schematic diagram illustrating the work site and an elevated view in accordance with embodiments of the present technology.

In some embodiments, after the first compressed view 201 is displayed for a period of time, the integrated user interface can further provide more spatial and contextual information of the selected first machine 21 (i.e., machine 103a). For example, as illustrated in FIG. 2B, a first elevated view 203 shows the first selected machine 21 and another machine of the same type. Specifically, the first elevated view 203 shows the details of the selected first machine 21 (i.e., machine 103a), a portion of the route 2, a portion of the object 16, a portion of the route 1, and details of the machine 103b (of the same type as machine 103a).

Figure 2C:
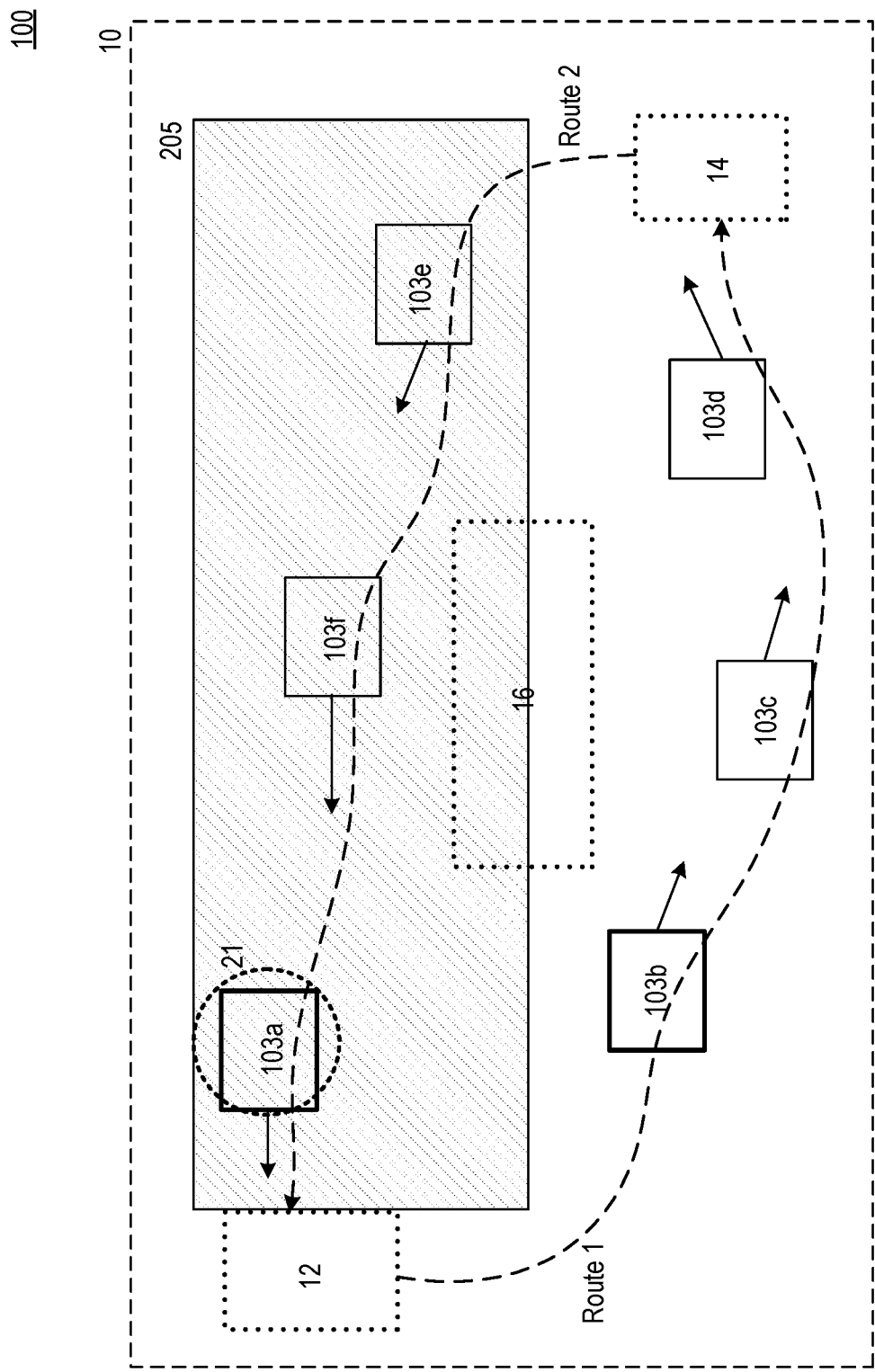
FIG. 2C is a schematic diagram illustrating the work site and another elevated view in accordance with embodiments of the present technology.

In some embodiments, the elevated view can be used to present a different set of spatial and contextual information of the selected first machine 21. For example, as illustrated in FIG. 2C, another elevated view (a second elevated view 205) shows the first selected machine 21 and other machines that travels in the same route as the first selected machine 21. More particularly, the second elevated view 205 shows the details of the selected first machine 21 (i.e., machine 103a), a portion of the route 2, a portion of the object 16, and details of the machines 103b, 103f, and 103e (which travel in the route 2).

Figure 2D:
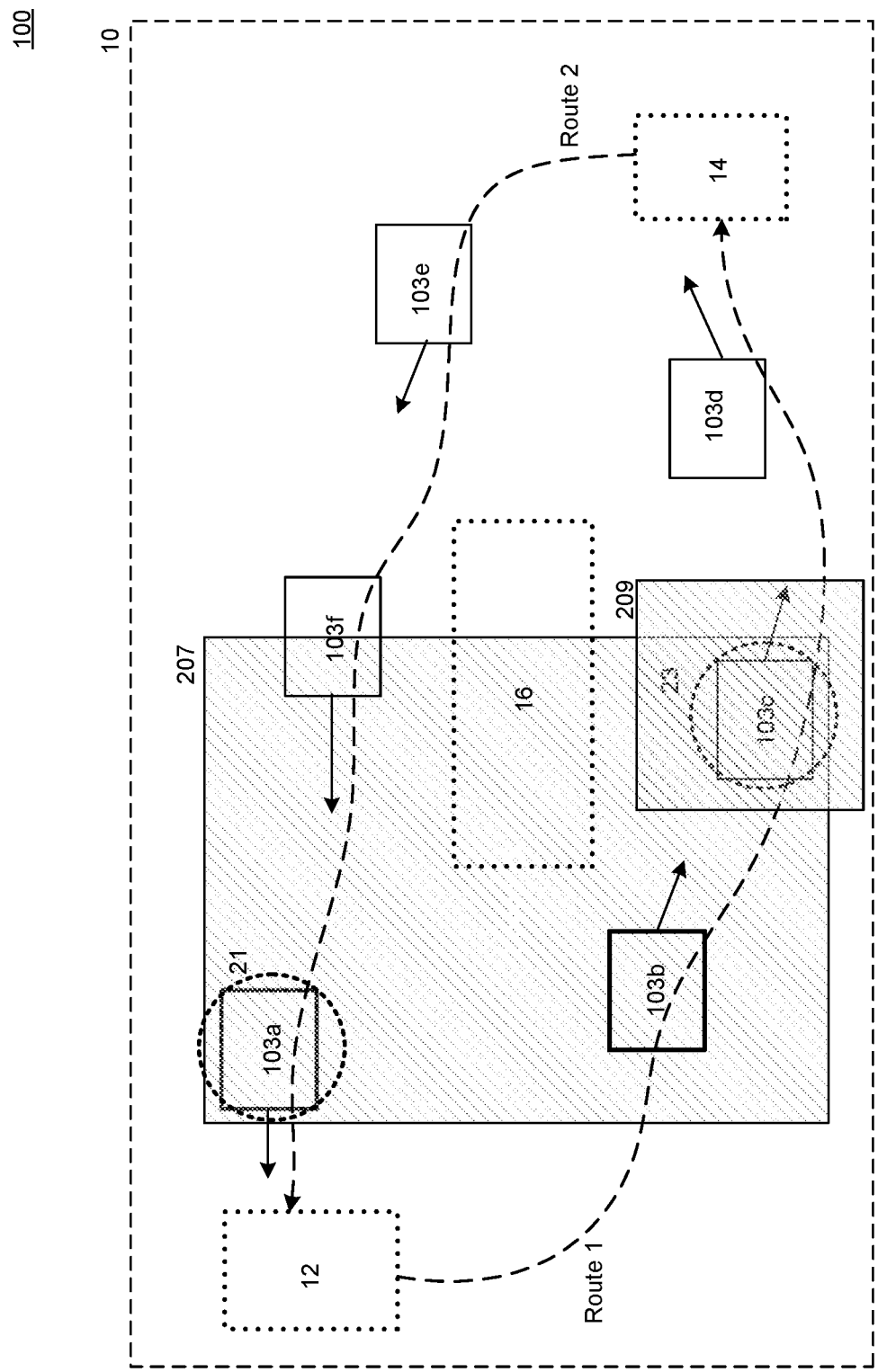
FIG. 2D is a schematic diagram illustrating the work site and another compressed view in accordance with embodiments of the present technology.

In some embodiments, the operator can further select a second machine 23 (i.e., machine 103c). In such embodiments, yet another elevated view (a third elevated view 207) for both the first and second machine can be displayed in the integrated user interface. For example, as illustrated in FIG. 2D, the third elevated view 207 shows both the selected first machine 21 and the selected second machine 23. As illustrated, the third elevated view 207 shows the details of the selected first machine 21 (machine 103a), a portion of the route 2, a portion of the object 16, a portion of the route 1, the details of the selected second machine 23 (i.e., machine 103c), and the machines 103b, 103f (which happen to be shown in the third elevated view 207, so no details for them in the illustrated embodiment). In other embodiments, the details of the machines 103b, 103f can also be displayed.

After the third elevated view 207 is displayed for a period of time, a second compressed view 209 of the selected second machine 23 (i.e., machine 103c) can be then displayed in the integrated user interface. The second compressed view 209 shows the details of the selected second machine 23 and a portion of the route 1.

To have a smooth transition between views, view changes are performed gradually among different views, such that the operator can experience a continuous, smooth "zoom-in" (e.g., "elevated view" to "compressed view") or "zoom-out" (e.g., "compressed view" to "elevated view") process. For example, the transition from the first compressed view 201 to the first elevated view 203 can be a smooth "zoom-out" process. As another example, the transition from the third elevated view 207 to the second compressed view 209 can be a smooth "zoom-in" process. By this arrangement, the operator receives better contextual and spatial information when changing views (e.g., knowing relative locations of the machines to be displayed).

Figure 2E:
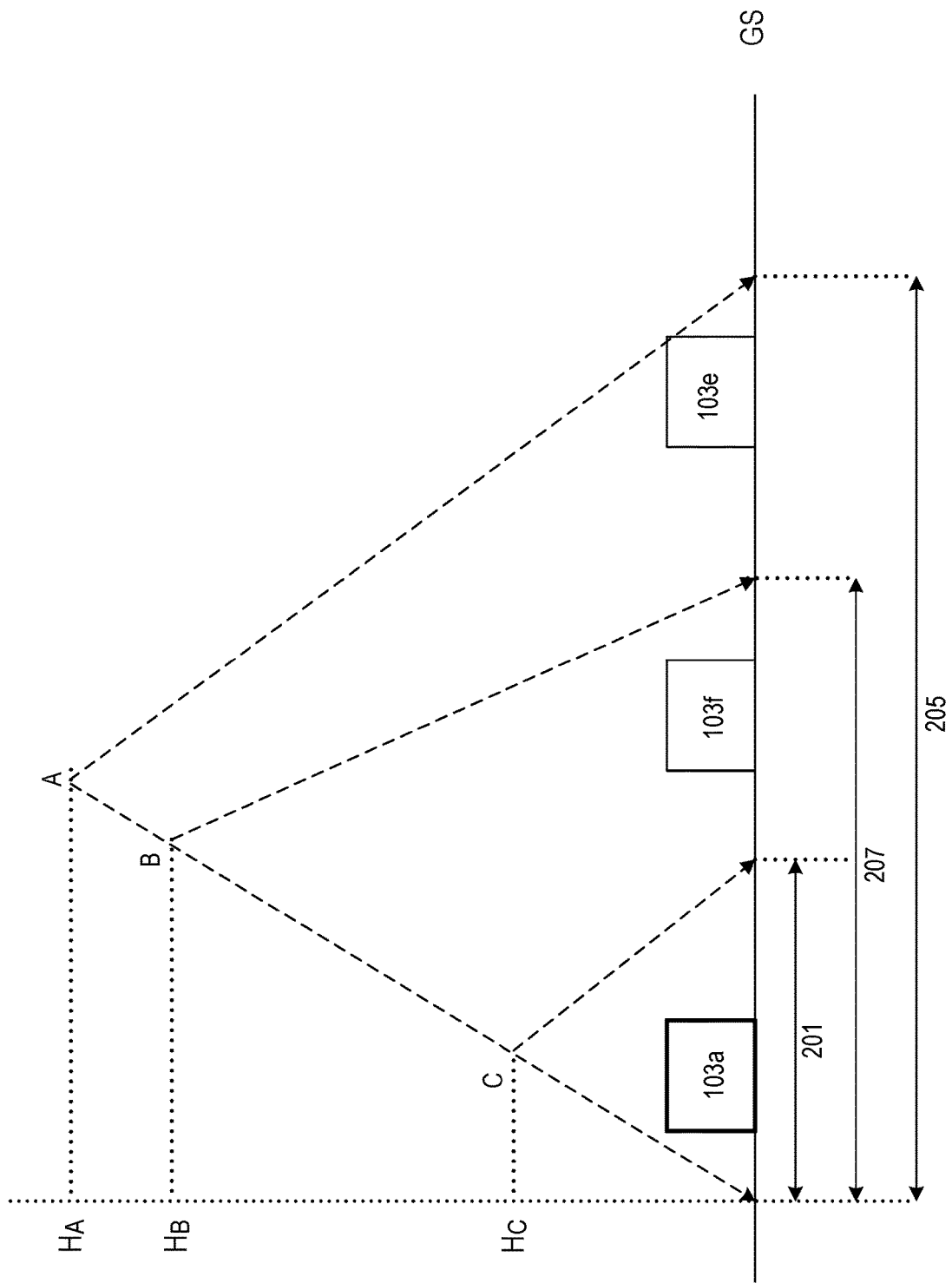
FIG. 2E is a schematic diagram illustrating different viewing elevation changes (or elevation gradients) of the work site in accordance with embodiments of the present technology.

FIG. 2E is a schematic diagram illustrating different viewing elevation changes (e.g., elevation gradients) of the work site in accordance with embodiments of the present technology. The viewing elevation changes can be referred to as "elevation gradients" in this application. As illustrated in FIG. 2E, the first compressed view 201 is observed at viewing elevation $H_A$, from the ground surface (GS), the third elevated view 207 is observed at viewing elevation $H_B$ from the GS, and the second elevated view 205 is observed at viewing elevation $H_c$ from the GS. A higher elevation usually corresponds to a greater viewing area. In other words, to view machines with a longer distance, the corresponding viewing elevation would be higher.

In some embodiments, the time periods for transiting different views can be fixed (e.g., 2-5 seconds). In some embodiments, the time periods for transiting views can correspond to the elevation gradients. The elevation gradient between the first compressed view 201 and the second elevated view 205 (i.e., "a first transition") can be "$H_A$-$H_C$" and the elevation gradient between the first compressed view 201 and the third elevated view 207 (i.e., a "second transition") can be "$H_B$-$H_C$." In such embodiments, the ratio between the time periods for the first and second transitions can be "$(H_A-H_C)/(H_B-H_C)$." By this arrangement, the operator can determine the distance between two machines based on the time period of the view transition. This arrangement provides spatial and contextual information of the machines in an intuitive fashion, which effectively facilitates the operator to understand the relative locations of the machines.

Figure 3:
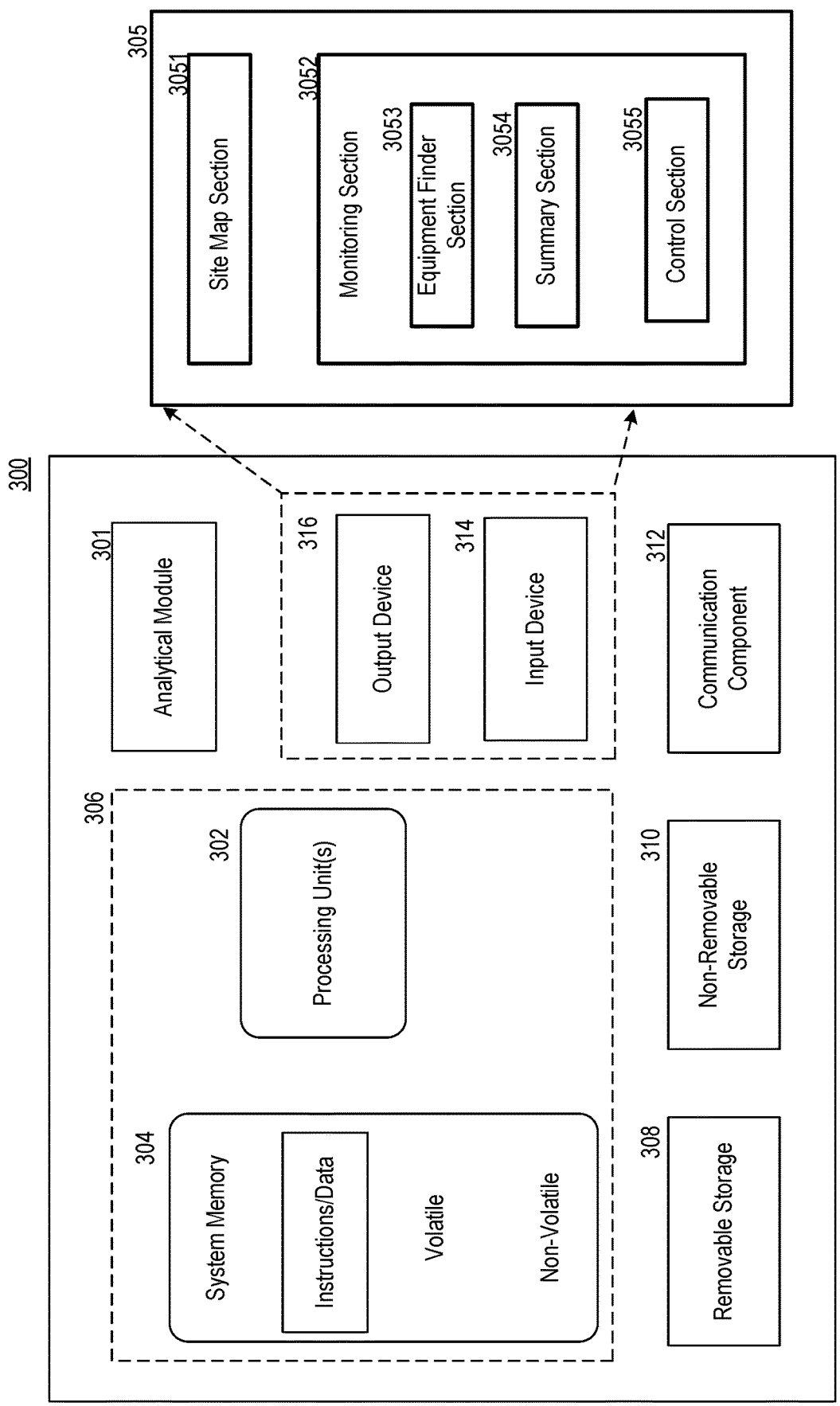
FIG. 3 is a schematic diagram illustrating components in a computing device (e.g., a server) and an example of an integrated user interface in accordance with embodiments of the present technology.

FIG. 3 is a schematic diagram illustrating components in a computing device 300 in accordance with embodiments of the present technology. An example of an integrated user interface 305 is also provided therein. The computing device 300 can be implemented as a server (e.g., the server 101). The computing device 300 is configured to process the methods (e.g., FIGS. 5 and 6) discussed herein. Note the computing device 300 is only an example of a suitable computing device and is not intended to suggest any limitation as to the scope of use or functionality. Other well-known computing systems, environments, and/or configurations that may be suitable for use include, but are not limited to, personal computers (PCs), server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, the computing device 300 includes at least one processing unit 302 and a memory 304. Depending on the exact configuration and the type of computing device, the memory 504 may be volatile (such as a random-access memory or RAM), non-volatile (such as a read-only memory or ROM, a flash memory, etc.), or some combination of the two. This most basic configuration is illustrated in FIG. 3 by dashed line 306. Further, the computing device 300 may also include storage devices (a removable storage 508 and/or a non-removable storage 310) including, but not limited to, magnetic or optical disks or tape. Similarly, the computing device 300 can have an input device 314 such as keyboard, mouse, pen, voice input, etc. and/or an output device 316 such as a display, speakers, printer, etc. Also included in the computing device 300 can be one or more communication components 312, such as components for connecting via a local area network (LAN), a wide area network (WAN), point to point, any other suitable interface, etc.

The computing device 300 can include an analytical module 301 configured to implement methods for managing the machines. For example, the analytical module 30 can be configured to determine the time periods for changing views discussed herein (e.g., FIG. 2E). In some embodiments, the analytical module 301 can be in form of instructions, software, firmware, as well as a tangible device.

In some embodiments, the output device 316 and the input device 314 can be implemented as the integrated user interface 305. The integrated user interface 305 is configured to visually present historical communications information and geographical information discussed herein. The integrated user interface 305 is also configured to receive an input regarding how a user would like to analyze the historical communications information. As shown, the integrated user interface 305 can include sections for indicating a site map section 3051 and a monitoring section 3052. The monitoring section 3052 can further include an equipment-finder section 3053, a summary section 3054, and a control section 3055. Embodiments of the integrated user interface 305 are discussed in detail with reference to FIGS. 4A-4G.

The computing device 300 includes at least some form of computer readable media. The computer readable media can be any available media that can be accessed by the processing unit 302. By way of example, the computer readable media can include computer storage media and communication media. The computer storage media can include volatile and nonvolatile, removable and non-removable media (e.g., removable storage 308 and non-removable storage 310) implemented in any method or technology for storage of information such as computer readable instructions, data structures, program modules or other data. The computer storage media can include, an RAM, an ROM, an electrically erasable programmable read-only memory (EEPROM), a flash memory or other suitable memory, a CD-ROM, digital versatile disks (DVD) or other optical storage, magnetic cassettes, magnetic tape, magnetic disk storage or other magnetic storage devices, or any other tangible medium which can be used to store the desired information.

The computing device 300 includes communication media or component 312, including non-transitory computer readable instructions, data structures, program modules, or other data. The computer readable instructions can be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, the communication media can include wired media such as a wired network or direct-wired connection, and wireless media such as acoustic, radio frequency (RF), infrared and other wireless media. Combinations of the any of the above should also be included within the scope of the computer readable media.

The computing device 300 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

Figure 4A:
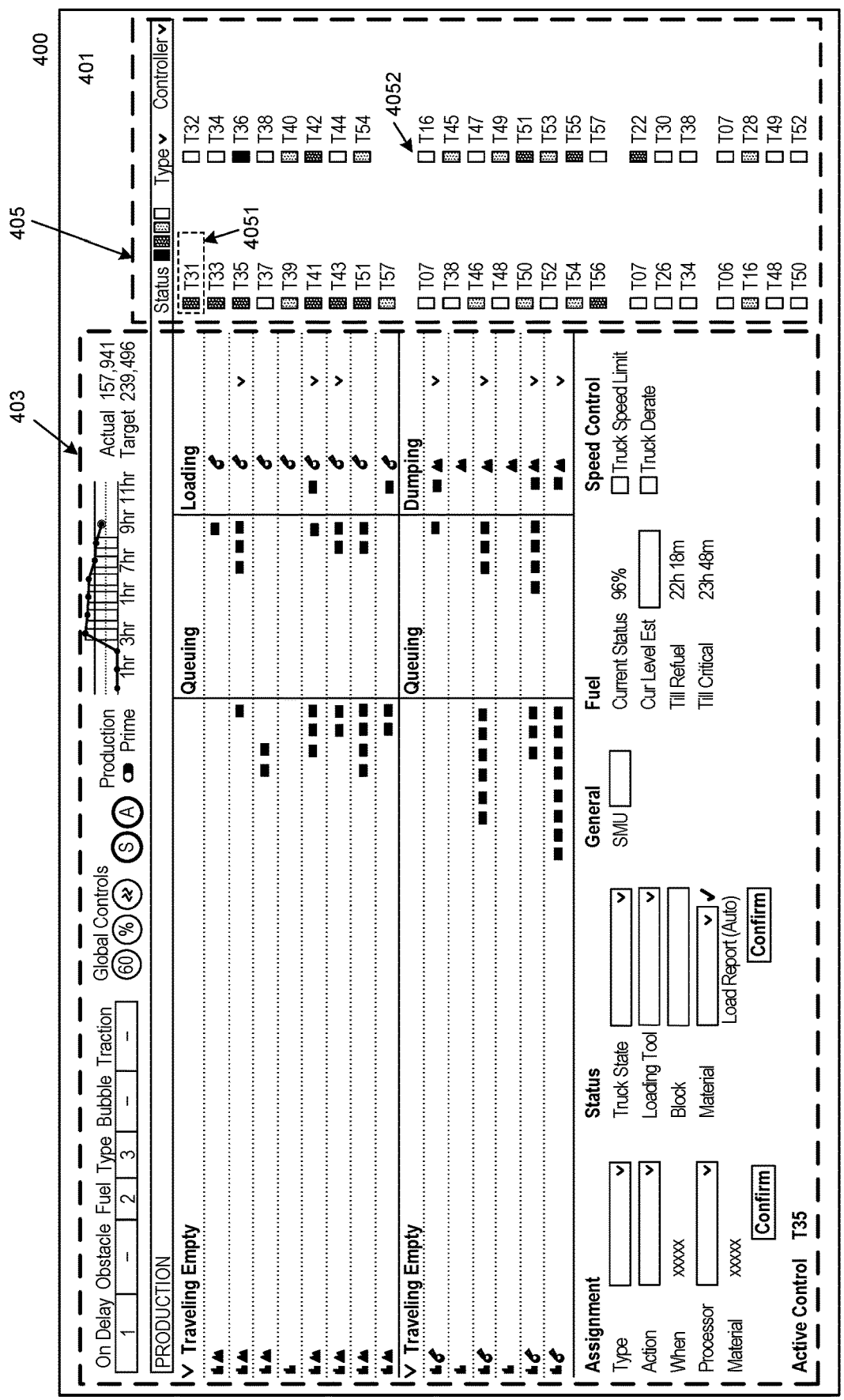
FIG. 4A is a screenshot of an integrated user interface in accordance with embodiments of the present technology. The integrated user interface in FIG. 4A includes a monitoring section, which further includes a summary section and an equipment-finder section.

FIG. 4A is a screenshot of an integrated user interface 400 in accordance with embodiments of the present technology. The integrated user interface 400 includes a monitoring section 401 which further includes a summary section 403 and an equipment-finder section 405. The summary section 403 is configured to display statuses of multiple machines that are managed by an operator via the integrated user interface 400. The summary section 403 can include information such as, names or codenames, signal strength for communicating, assigned tasks, groups, types, fuel information, speed information, traveling route, traveled paths, etc.

As shown, the equipment-finder section 405 has multiple tiles 4051, each of which corresponds to one machine of the multiple machines. The equipment-finder section 405 is configured to enable the operator to select a machine of interests. By clicking the tiles 4051, the corresponding machine can be selected and its spatial and contextual information can be shown in a site map section (e.g., FIGS. 4D-4G) of the integrated user interface 400.

The equipment-finder section 405 is also configured to indicate the statuses of the multiple machines in a work site. For example, the equipment-finder section 405 can include various colored indicators to show the status of the machines (e.g., "Red" refers to an alarm; "Blue" refers to an action from the operator is requested; "Yellow" means the machine is on route to an assigned task; "Gray" can mean "normal" and no further action from the operator is required). In some embodiments, the equipment-finder section 405 can include a status bar 4052 configured to indicate a loading status of a machine. For example, a solid or filled bar can indicate that the corresponding machine has a full load. A half-filled bar can indicate that the corresponding machine has a half load. An "empty" bar can indicate that the corresponding machine does not have any load.

Figure 4B:
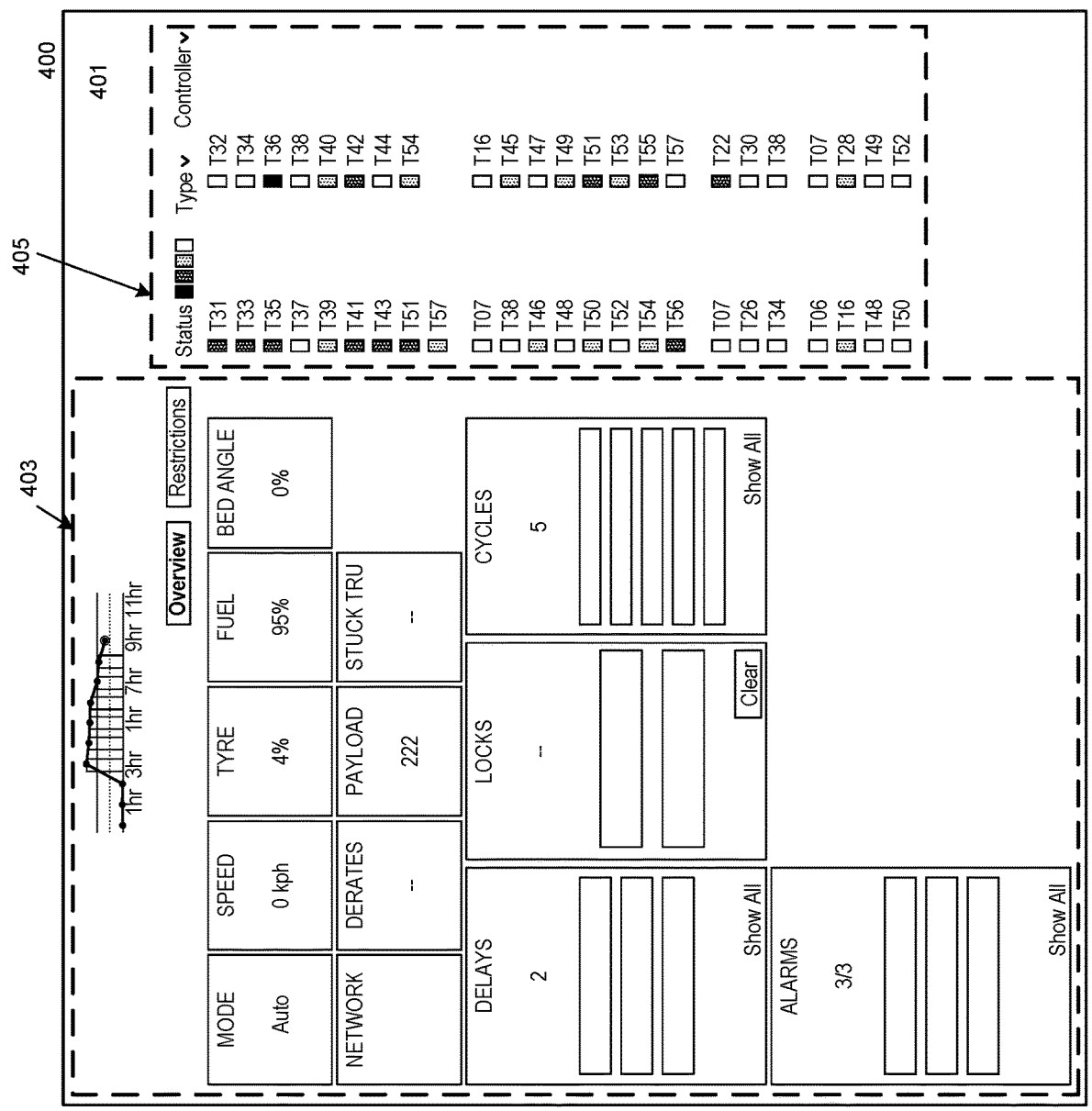
FIG. 4B is a screenshot of a summary section and an equipment-finder section of the integrated user interface in accordance with embodiments of the present technology.
Figure 4C:
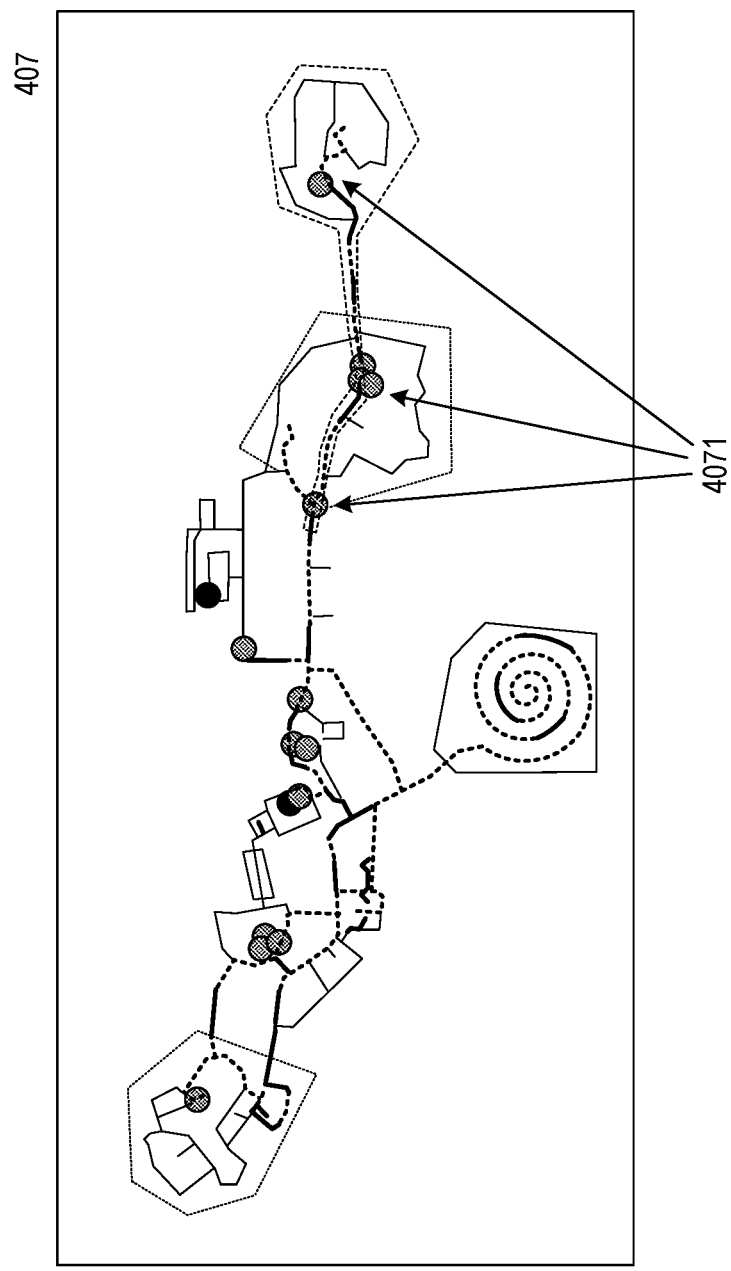
FIG. 4C is a screenshot of a site map section (e.g., an overall view) of the integrated user interface in accordance with embodiments of the present technology.
Figure 4E:
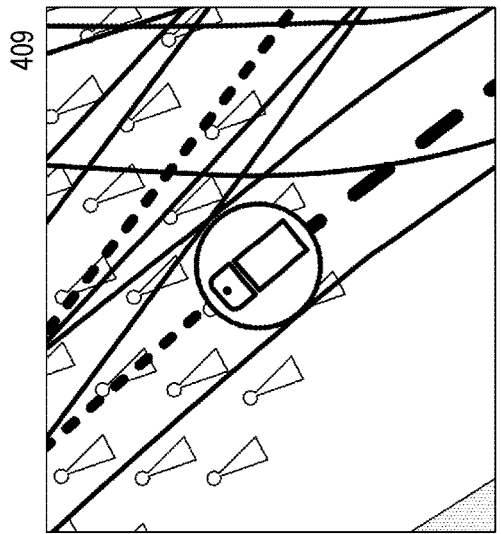
FIG. 4E is a screenshot of a first compressed view in the site map section of the integrated user interface in accordance with embodiments of the present technology.
Figure 4F:
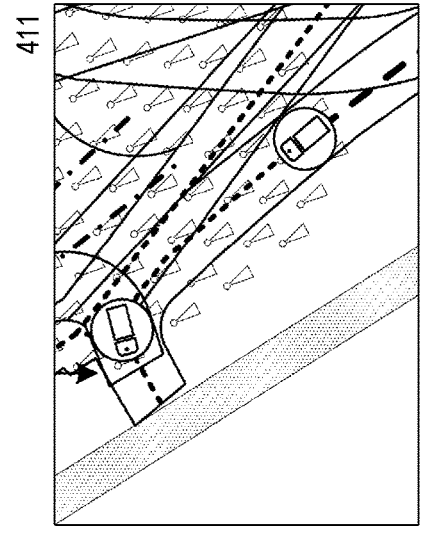
FIG. 4F is a screenshot of a second compressed view in the site map section of the integrated user interface in accordance with embodiments of the present technology.
Figure 4D:
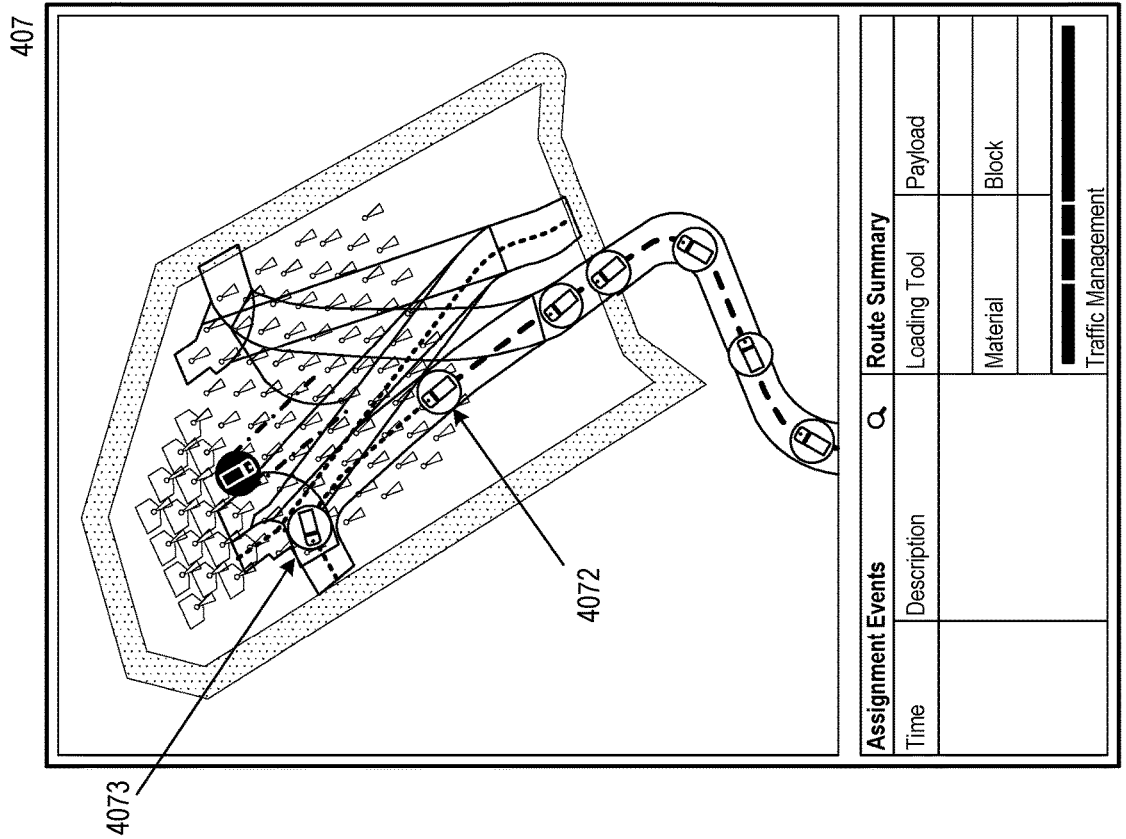
FIG. 4D is a screenshot of an elevated view in the site map section of the integrated user interface in accordance with embodiments of the present technology.
Figure 4G:
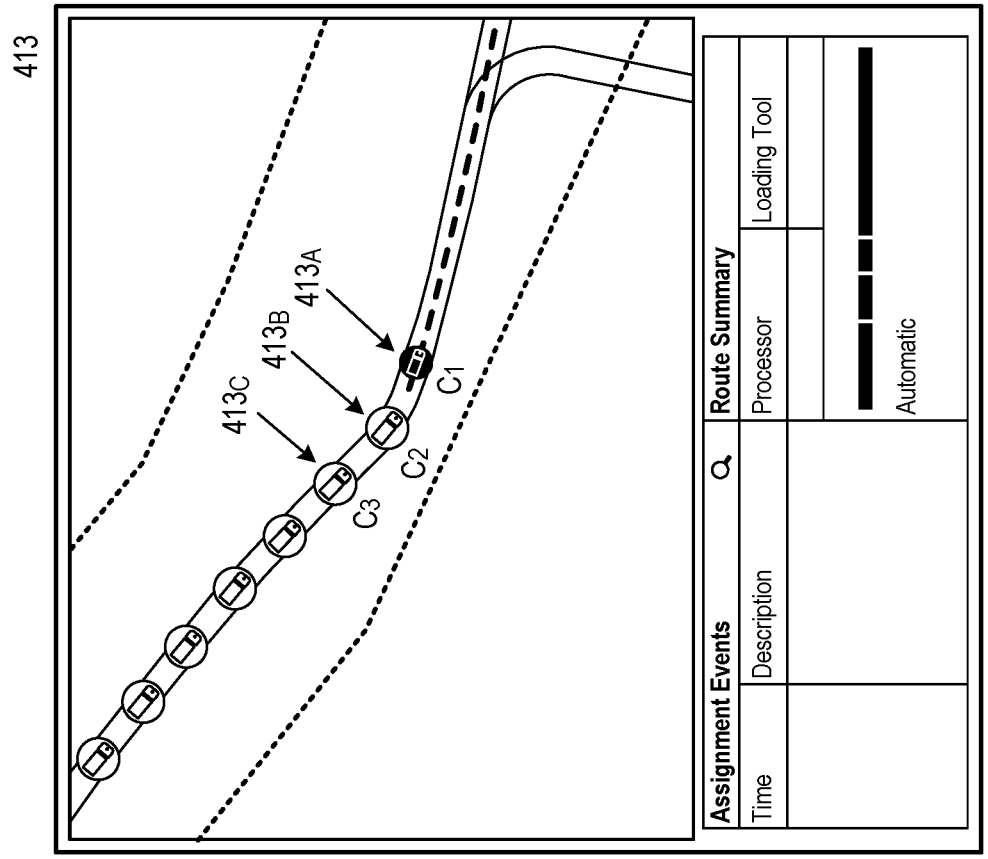
FIG. 4G is an elevated view in the site map section of the integrated user interface in accordance with embodiments of the present technology.

FIG. 4B shows additional embodiments of the summary section 403 and the equipment-finder section 405 of the integrated user interface 400. As shown in the equipment-finder section 405, machine "T42" is selected. In response to the selection, the summary section 403 displays information related to the selected "T42" machine, such as modes (automatic, semi-automatic, or manual), speeds, network status, payload, tire statuses, bed angles, alarms, task cycles, etc.

FIG. 4C is a screenshot of a site map section 407 of the integrated user interface 400. In the illustrated embodiment, an overall view of a work site is displayed in the site map section 407. Machines in the work site can be indicated by colored circles 4071. The colors of the circles 4071 can correspond to the colors shown in the equipment-finder section 405.

FIG. 4D is an embodiment of the site map section 407. In this embodiment, an elevated view is shown. In some embodiments, the site map section 407 is also configured to enable the operator to select machines of interests. For example, the operator can select a first machine 4072 in the site map section 407. In response to the section of the first machine 4072, the site map section 407 then displays a first compressed view 409 shown in FIG. 4E.

The operator can then select a second machine 4073 in the site map section 407. In response to the section of the first machine 4072, the site map section 407 then displays a second compressed view 411 shown in FIG. 4F. In the illustrated embodiment, both the selected first machine 4072 and the selected second machine 4073 are shown in the second compressed view 411. In other embodiments, the second compressed view 411 can display only the selected second machine 4073.

FIG. 4G is an elevated view 413 that can be shown in the site map section 407. The elevated view 413 shows spatial and contextual information of multiple machines in a work site. As shown in FIG. 4G, first, second, and third machines $413_A$, $413_B$, and $413_C$ travel in the same route. Assume that the operator selects (e.g., by clicking it in the site map section 407 or via the equipment-finder section 405) and instructs to "lock" or "stop" the first machine $413_A$. In response, as shown FIG. 4G, the first machine $413_A$ is indicated as "locked" or "stopped" by a small circle $C_1$. The second machine $413_B$ is indicated as "delayed" (e.g., caused by the stop of the first machine $413_A$) by a large circle $C_2$. The third machine $413_C$ is indicated as "on route" (e.g., not affected by the stop of the first machine $413_A$ so far) by a medium circle $C_3$. By this arrangement, the operator can have a clear view and understanding of the consequence (e.g., delay of the second machine $413_B$ and possible delay of the third machine $413_C$) of his or her action (e.g., stop or lock the first machine $413_A$) based on the spatial and contextual information provided by the elevated view 413.

Figure 5:
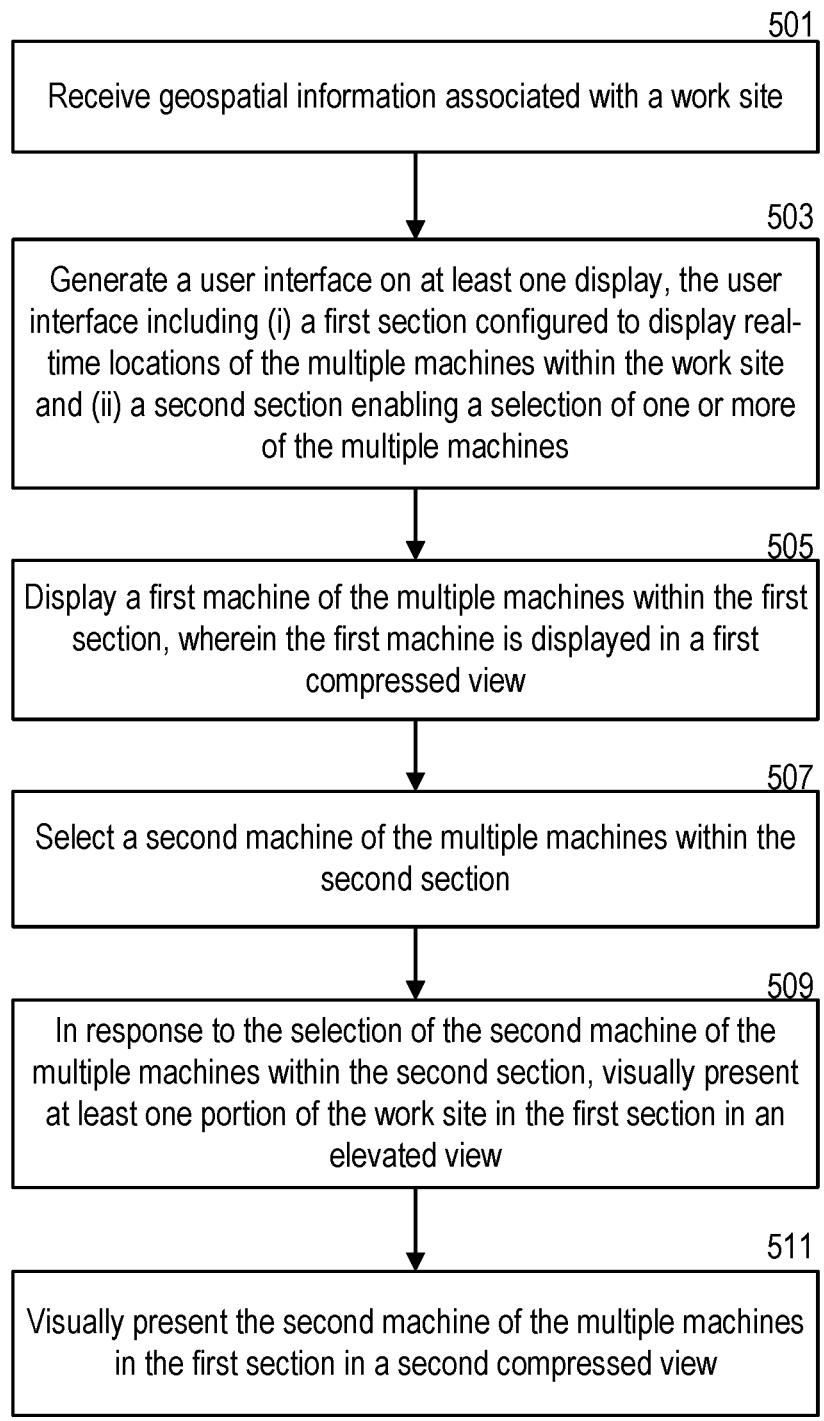
FIG. 5 is a flow diagram showing a method in accordance with embodiments of the present technology.

FIG. 5 is a flow diagram showing a method 500 for managing multiple machines in a real-time manner. The method 500 can be implemented by a server (e.g., the server 101), a computing device (e.g., the computing device 300), and/or any other suitable devices. The method 500 starts at block 501 by receiving geographical information associated with a work site. In some embodiments, the geographical information can include a map, coordinate information, longitudinal and latitudinal information, altitudinal information, etc. Step 501 can be implemented by the server. In some embodiments, the machine can generate (e.g., images captured by the machine) or receive (e.g., from another machine) the geographical information associated with the work site and then transmit it to the server.

At block 503, the method 500 continues by generating a user interface on at least one display. The user interface includes (i) a first section configured to display real-time locations of the multiple machines within the work site and (ii) a second section enabling a selection of one or more of the multiple machines. Embodiments of the first section includes the monitoring section 3052 discussed above with reference to FIG. 3. Embodiments of the second section includes the site map section 3051 discussed above with reference to FIG. 3.

At block 505, the method 500 continues by displaying a first machine of the multiple machines within the first section. The first machine can be displayed in a first compressed view (e.g., FIG. 4E). At block 507, the method 500 continues by selecting a second machine of the multiple machines within the second section. In some embodiments, the second machine can be selected in the first section (in cases where it is shown therein).

At block 509, the method 500 includes, in response to the selection of the second machine of the multiple machines within the second section, visually presenting at least one portion of the work site in the first section in an elevated view (e.g., FIG. 4D).

In some embodiments, the at least one portion of the work site provides spatial and contextual information regarding the second machine and/or the first machine. In some embodiments, the spatial and contextual information indicates one or more other machines within the work site (e.g., FIGS. 4D and 4G). In some embodiments, the spatial and contextual information indicates a route for the second machine and the one or more other machines to move. In some cases, the spatial and contextual information indicates at least one obstacle surrounding the first machine.

In some embodiments, the elevated view displays one or more elevation gradients (i.e., changes of viewing elevations; e.g., FIG. 2E) between the first machine and the second machine. In some embodiments, the at least one portion of the work site is determined based on a distance between the first machine and the second machine. In some embodiments, the at least one portion of the work site can be visually presented in the elevated view for a time period. Upon expiration of the time period, the second machine of the multiple machines can be visually presented in the first section. The time period can be fixed such as 1-5 seconds. The time period can also be determined based on the distance between the first machine and the second machine (e.g., farther distance, longer time).

At block 511, the method 500 continues by visually presenting the second machine of the multiple machines in the first section in a second compressed view (e.g., FIG. 4F). In some embodiments, the first and second compressed views can be of different elevations. In some embodiments, the first and second compressed views can be at the same elevation.

In some embodiments, the method 500 further comprises determining a group of machines of the multiple machines based on a grouping status (e.g., traveling in a route, assigned the same task, type of machines, etc.) of the second machine. In some embodiments, the at least one portion of the work site is determined based on the group of machines.

In some embodiments, the at least one portion of the work site in the first section in the elevated view is determined based on a geographic boundary (e.g., a river, a mountain, etc.). In some embodiments, the at least one portion of the work site in the first section in the elevated view can be determined based on a site-specific boundary (e.g., a loading area, a restrict area, a dumping area, etc.) of the work site.

In some embodiments, the user interface can include a third section configured to visually present a group of machines associated with the second machine. The third section can be a pop-up section showing a group of machines, or a highlighted section in the existing user interface (e.g., one or more highlighted tiles 4051 in the equipment-finder section 405).

In some embodiments, the user interface can include an identifier for identifying the group of machines associated with the second machine. For example, the identifier can be a colored circle (e.g., FIG. 4C), a highlighted section (e.g., a highlighted tile 4051 in the equipment-finder section 405), etc. In some embodiments, the identifier consists of a color identifier, a string identifier, or a symbol identifier. In some embodiments, the user interface can include a directional indicator (e.g., arrows shown in FIG. 2A-2D) configured to indicate a moving direction of one or more of the multiple machines.

Figure 6:
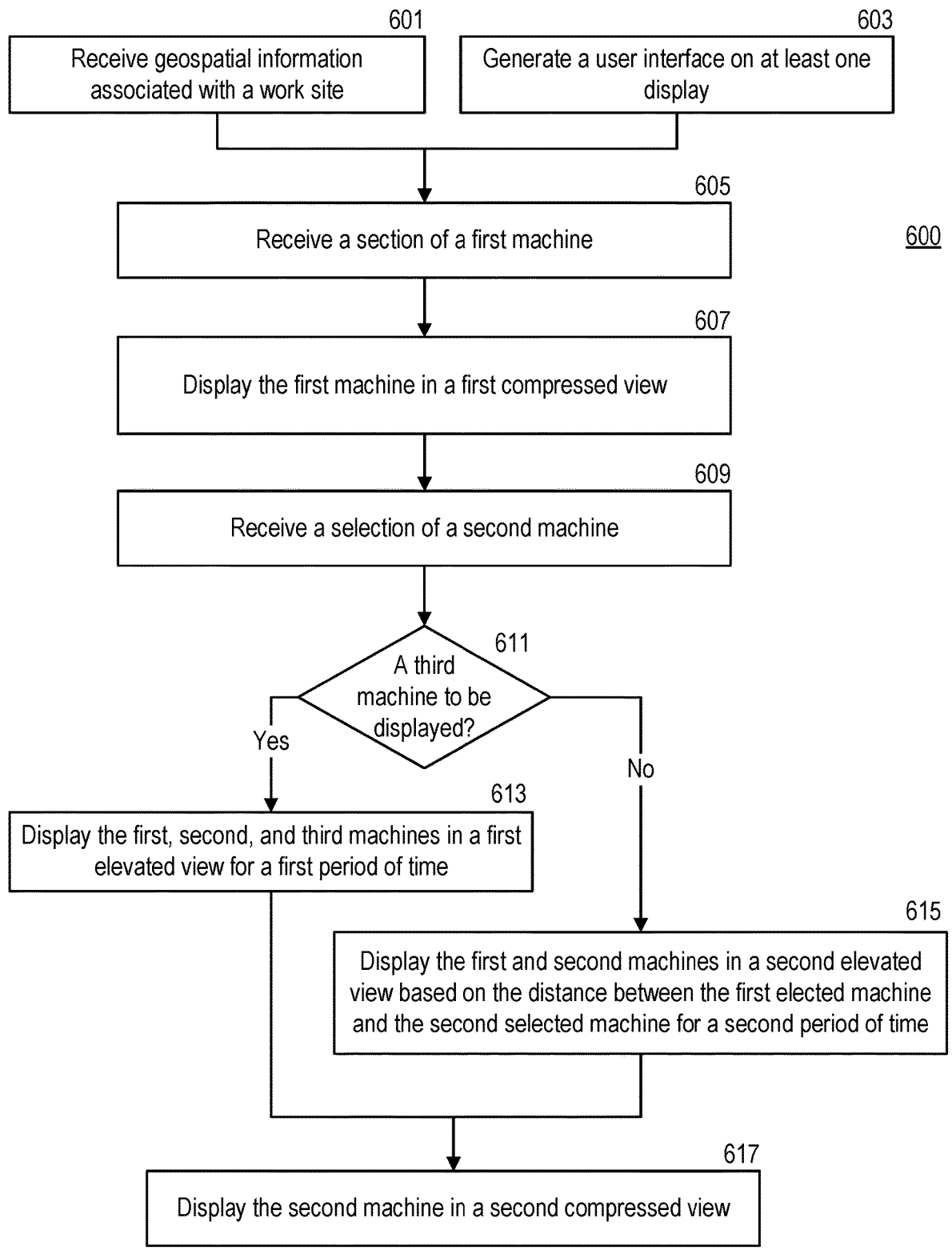
FIG. 6 is a flow diagram showing a method in accordance with embodiments of the present technology.

FIG. 6 is a flow diagram showing a method 600 for managing multiple machine. The method 600 can be implemented by a server (e.g., the server 101), a computing device (e.g., the computing device 300), and/or any other suitable devices. At block 601, the method 600 starts by receiving geographical information associated with a work site. In some embodiments, the geographical information can include a map, coordinate information, longitudinal and latitudinal information, altitudinal information, etc. In a parallel step, at block 603, the method 600 includes generating a user interface on at least one display.

At block 605, the method 600 continues by receiving a section of a first machine, for example, via the user interface. As block 607, the first machine is displayed in a first compressed view. As block 609, the method 600 continues by receiving a section of a second machine, for example, via the user interface.

The method 600 then moves to decision block 611 and determines whether there is a third machine to be displayed. For example, if there is a machine (i) between the selected first and second machine; or (ii) close to the first or second machine, that machine can be the third machine to be displayed together with the first and second machines.

If the determination at block 611 is affirmative, the process moves to block 613 to display the first, second, and third machines in a first elevated view for a first period of time. If the determination at block 611 is negative, the process moves to block 615 to display the first and second machines in a second elevated view based on the distance between the first elected machine and the second selected machine for a second period of time. After the expiration of the first or second period of time, the method 600 then continues to block 617 and displays the second machine in a second compressed view.

INDUSTRIAL APPLICABILITY

The systems and methods described herein can manage multiple machines in a work site. The systems provides an integrated user interface to provide spatial and contextual information of the multiple machines to an operator such that the operator can effectively manage the multiple machines. The integrated user interface includes a site map section and a monitoring section. Various views (overall, elected, compressed views etc.) of selected machines can be displayed in the site map section. The transition of these views are smooth, continuous, and can be relevant to the viewing elevations (FIG. 2E) or distances among the machines to be displayed. The present systems and methods can be implemented to manage, monitor, and communicate with multiple industrial machines, vehicles and/or other suitable devices such as mining machines, trucks, corporate fleets, etc.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for managing multiple machines in a real-time manner, the method comprising:
   receiving geospatial information associated with a work site;
   generating a user interface on at least one display, wherein the user interface includes a first section configured to display real-time locations of the multiple machines within the work site, and wherein the user interface includes a second section enabling a selection of one or more of the multiple machines;
   displaying a first machine of the multiple machines within the first section, wherein the first machine is displayed in a first compressed view;
   selecting a second machine of the multiple machines within the second section;
   in response to the selection of the second machine of the multiple machines within the second section, visually presenting at least one portion of the work site in the first section in an elevated view at a first time, wherein the elevated view provides spatial and contextual information regarding the second machine, wherein the spatial and contextual information indicates one or more other machines within the work site, and wherein the spatial and contextual information indicates work site information external to an are defined by the first and second machines; and
   visually presenting, at a second time following the first time, but prior to receiving any subsequent selections, the second machine of the multiple machines in the first section in a second compressed view.

2. The method of claim 1, wherein the elevated view displays one or more elevation gradients between the first machine and the second machine.

3. The method of claim 1, wherein the first and second compressed views are of different elevations.

4. The method of claim 1, wherein the spatial and contextual information indicates a route for the second machine and the one or more other machines to move.

5. The method of claim 1, wherein the elevated view indicates at least one obstacle surrounding the first machine.

6. The method of claim 1, wherein the at least one portion of the work site is determined based on a distance between the first machine and the second machine.

7. The method of claim 1, wherein the at least one portion of the work site is visually presented in the elevated view for a time period, and wherein, upon expiration of the time period, the second machine of the multiple machines is visually presented in the first section.

8. The method of claim 7, wherein the time period is determined based on a distance between the first machine and the second machine.

9. The method of claim 1, wherein the at least one portion of the work site corresponds to an association between the second machine and the one or more other machines within the work site.

10. The method of claim 1, further comprising determining a group of machines of the multiple machines based on a grouping status of the second machine, and wherein the at least one portion of the work site is determined based on the group of machines.

11. The method of claim 10, wherein the grouping status is indicative of a type of the first machine.

12. The method of claim 11, wherein the grouping status is indicative of a task assigned to the first machine.

13. The method of claim 1, wherein the at least one portion of the work site in the first section in the elevated view is determined based on a geographic boundary.

14. The method of claim 1, wherein the at least one portion of the work site in the first section in the elevated view is determined based on a site-specific boundary of the work site.

15. The method of claim 1, wherein the user interface includes a third section configured to visually present a group of machines associated with the second machine.

16. The method of claim 15, wherein the user interface includes an identifier for identifying the group of machines associated with the second machine.

17. The method of claim 16, wherein the identifier comprises a color identifier, a string identifier, or a symbol identifier.

18. The method of claim 1, wherein the user interface includes a directional indicator configured to indicate a moving direction of one or more of the multiple machines.

19. A system, comprising:
a processor; and
a memory communicably coupled to the one processor, the memory comprising computer executable instructions, when executed by the processor, to:
receive geospatial information associated with a work site;
generate a user interface on at least one display, wherein the user interface includes a first section configured to display real-time locations of the multiple machines within the work site, and wherein the user interface includes a second section enabling a selection of one or more of the multiple machines;
display a first machine of the multiple machines within the first section, wherein the first machine is displayed in a first compressed view;
select a second machine of the multiple machines within the second section;
in response to the selection of the second machine of the multiple machines within the second section, visually present at least one portion of the work site in the first section in an elevated view at a first time, wherein the elevated view provides spatial and contextual information regarding the second machine, wherein the spatial and contextual information indicates one or more other machines within the work site, and wherein the spatial and contextual information indicates work site information external to an area defined by the first and second machines; and
visually present, at a second time following the first time, but prior to receiving any subsequent selections, the second machine of the multiple machines in the first section in a second compressed view.

20. A method for managing multiple machines in a real-time manner, the method comprising:
receiving geospatial information associated with a work site;
generating a user interface on at least one display, wherein the user interface includes a first section configured to display real-time locations of the multiple machines within the work site, and wherein the user interface includes a second section enabling a selection of one or more of the multiple machines;
displaying a first machine of the multiple machines within the first section, wherein the first machine is displayed in a first compressed view;
selecting a second machine of the multiple machines within the second section;
in response to the selection of the second machine of the multiple machines within the second section, visually presenting at least one portion of the work site in the first section in a visual presentation at a first time, wherein the visual presentation of the at least one portion of the work site provides spatial and contextual information regarding the second machine, wherein the spatial and contextual information indicates one or more other machines within the work site, and wherein the spatial and contextual information indicates work site information external to an area defined by the first and second machines; and
visually presenting, at a second time following the first time, but prior to receiving any subsequent selections, second machine of the multiple machines in the first section in a second compressed view.

* * * * *